(12) United States Patent
Saitou et al.

(10) Patent No.: US 7,825,787 B2
(45) Date of Patent: Nov. 2, 2010

(54) WHEEL IDENTIFYING APPARATUS HAVING TRIGGERING DEVICES ASSOCIATED WITH EACH AXLE AND MOUNTED AT AN ORIENTATION ANGLE OF 0 TO 90°

(75) Inventors: Takashi Saitou, Okazaki (JP); Akira Takaoka, Okazaki (JP); Nobuya Watabe, Nagoya (JP); Masashi Mori, Oobu (JP); Tomohiro Kuno, Nagoya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 342 days.

(21) Appl. No.: 12/106,089

(22) Filed: Apr. 18, 2008

(65) Prior Publication Data

US 2008/0258894 A1    Oct. 23, 2008

(30) Foreign Application Priority Data

Apr. 18, 2007    (JP)    ............................. 2007-109226

(51) Int. Cl.
 *B60C 23/00*    (2006.01)
(52) U.S. Cl. .................. 340/447; 340/442; 73/146.5
(58) Field of Classification Search ............. 340/442, 340/445, 447, 539.1; 73/146, 2, 4, 5
See application file for complete search history.

(56) References Cited

U.S. PATENT DOCUMENTS

| 5,602,524 | A  | 2/1997 | Mock et al. |
| 6,885,293 | B2 | 4/2005 | Okumura |
| 2007/0008097 | A1 | 1/2007 | Mori et al. |

FOREIGN PATENT DOCUMENTS

| JP | 7-507513   | 8/1995 |
| JP | 2004-161245 | 6/2004 |
| JP | 2007-15491 | 1/2007 |
| JP | 2007-17260 | 1/2007 |

*Primary Examiner*—Jeffery Hofsass
(74) *Attorney, Agent, or Firm*—Nixon & Vanderhye PC

(57) ABSTRACT

In a wheel identifying apparatus, first and second devices respectively transmit first and second trigger signals. The first device is mounted on the body of a vehicle closer to the front axle than the rear axle and closer to one of the front wheels than the other; it has the same height as the front axle and an orientation angle in a range of 0 to 90°. The second device is mounted on the vehicle body closer to the rear axle than the front axle and closer to one of the rear wheels than the other; it has the same height as the rear axle and an orientation angle in a range of 0 to 90°. Consequently, the first trigger signal can be reliably received by transceivers on the front wheels, and the second trigger signal can be reliably received by transceivers on the rear wheels.

9 Claims, 5 Drawing Sheets

WHEEL IDENTIFYING APPARATUS HAVING TRIGGERING DEVICES ASSOCIATED WITH EACH AXLE AND MOUNTED AT AN ORIENTATION ANGLE OF 0 TO 90°

CROSS-REFERENCE TO RELATED APPLICATION

This application is based on and claims priority from Japanese Patent Application No. 2007-109226, filed on Apr. 18, 2007, the content of which is hereby incorporated by reference in its entirety into this application.

BACKGROUND OF THE INVENTION

1. Technical Field of the Invention

The present invention relates to a wheel identifying apparatus for use in a vehicle, which has an improved mounting structure of triggering devices for ensuring the accuracy of wheel identification of the apparatus.

2. Description of the Related Art

A direct-type tire inflation pressure detecting apparatus generally includes a plurality of transmitters (or transceivers) and a receiver.

Each of the transmitters is directly mounted on one of a plurality of wheels of a vehicle and includes a pressure sensor for sensing the inflation pressure of a tire fitted on the wheel. Each of the transmitters is configured to transmit a pressure signal representative of the inflation pressure of the tire sensed by the pressure sensor.

The receiver is mounted on the body of the vehicle and includes at least one antenna. The receiver is configured to receive, via the antenna, the pressure signals transmitted from the transmitters and determine the inflation pressures of the tires based on the received pressure signals.

In the above apparatus, the receiver may also receive pressure signals transmitted by external transmitters (e.g., transmitters mounted on wheels of other vehicles). However, it is impossible for the receiver to determine whether a pressure signal received thereby has been transmitted by one of the transmitters of the apparatus or by an external transmitter. Moreover, it is also impossible for the receiver to detect the locations of the transmitters on the vehicle. In other words, the receiver cannot identify the wheel on which the transmitter having transmitted a pressure signal and the tire whose inflation pressure is indicated by the pressure signal are located.

To solve the above problems, as disclosed in U.S. Pat. No. 5,602,524, each of the transmitters may be further configured to transmit an identification signal (to be referred to as ID signal hereinafter) representative of the identity thereof along with the pressure signal. On the other hand, the receiver may be further configured to have reference ID signals registered therein, each of which coincides with the ID signal of one of the transmitters and is associated with the location of that transmitter.

Thus, the receiver may compare an ID signal received thereby with the reference ID signals registered therein and identify the transmitter which has transmitted the ID signal when the ID signal coincides with one of the reference ID signals.

Consequently, the receiver can identify the wheel on which the identified transmitter is mounted. More specifically, the receiver can determine whether the wheel is a FR (front-right), a FL (front-left), a KR (rear-right), or a RL (rear-left) wheel of the vehicle. Further, the receiver can determine the inflation pressure of the tire fitted on the identified wheel based on the pressure signal received along with the ID signal.

However, with the above configuration, it is required to previously register the ID signals specific to the respective transmitters as reference ID signals in the receiver through associating the ID signals with the locations of the respective transmitters on the vehicle (i.e., the wheels on which the respective transmitters are mounted). Moreover, as tire replacement or rotations are performed, it is required to update the reference ID signals in the receiver.

However, the registration of the ID signals in the receiver is a time-consuming task, and thus it is desired to automatically perform the registration task. Further, for automatically performing the registration task, it is desired to automatically detect the locations of the transmitters (or the associated tires), in other words, to automatically identify the wheel on which each of the transmitters (or the associated tires) is located.

To meet the above desires, US Patent Application Publication No. 2007/0008097 A1 discloses a wheel identifying apparatus. This apparatus includes a plurality of transceivers, each of which is located on one of a plurality of wheels of a vehicle, at least one triggering device that is mounted on the body of the vehicle at different distances from the transceivers, and a receiver located on the body of the vehicle. The triggering device transmits a trigger signal whose strength attenuates with increase in the distance from the triggering device. Therefore, the strengths of the trigger signal at the transceivers are different from each other. In response to receipt of the trigger signal, each of the transceivers determines the strength of the trigger signal thereat and transmits a response signal which conveys signal strength information on the determined strength of the trigger signal. The receiver receives the response signals transmitted by the transceivers and identifies, for each of the received response signals, the wheel on which the transceiver having transmitted the response signal is located based on the signal strength information conveyed by the response signal.

Further, as an application to a four-wheel vehicle, the wheel identification apparatus includes a first triggering device and a second triggering device. The first triggering device is mounted on the body of the vehicle closer to the front axle of the vehicle than the rear axle, so that a first trigger signal transmitted by the first triggering device can be received only by the transceivers located on the front wheels (i.e., the FR and FL wheels). Further, the first triggering device is mounted at different distances from the front wheels, so that strengths of the first trigger signal at the transceivers on the front wheels are different from each other. Thus, the receiver can identify, for each of the transceivers on the front wheels, the wheel on which the transceiver is located based on the strength of the first trigger signal at the transceiver. On the other hand, the second triggering device is mounted on the body of the vehicle closer to the rear axle of the vehicle than the front axle, so that a second trigger signal transmitted by the second triggering device can be received only by the transceivers located on the rear wheels (i.e., RR and RL wheels). Further, the second triggering device is mounted at different distances from the rear wheels, so that strengths of the second trigger signal at the transceivers on the rear wheels are different from each other. Thus, the receiver can identify, for each of the transceivers on the rear wheels, the wheel on which the transceiver is located based on the strength of the second trigger signal at the transceiver.

With the above configuration, for ensuring the accuracy of wheel identification of the apparatus, it is essential that the first trigger signal transmitted by the first triggering device can be reliably received by both the transceivers on the front wheels, and the second trigger signal transmitted by the second triggering device can be reliably received by both the transceivers on the rear wheels.

To this end, one may consider increasing the transmitting strengths at which the first and second triggering devices transmit the respective first and second trigger signals. However, with the increased transmitting strengths, the first trigger signal may be unwantedly received by either or both of the transceivers on the rear wheels, and the second trigger signal may be unwantedly received by either or both of the transceivers on the front wheels. Moreover, the transmitting strengths of the first and second trigger signals are usually restricted under regulations. Therefore, there is a limitation in increasing the transmitting strengths of the first and second trigger signals.

Furthermore, there exist several factors attenuating the first and second trigger signals, such as the relatively long distances between the first triggering device and the farther one of the transceivers on the front wheels and between the second triggering device and the farther one of the transceivers on the rear wheels, which generally correspond to the length of the front and rear axles of the vehicle, and metal structures existing in the transmission paths of the first and second trigger signals. Therefore, when the first and second triggering devices are not suitably mounted on the body of the vehicle, it will be difficult to ensure that the first trigger signal is reliably received by both the transceivers on the front wheels and the second trigger signal is reliably received by both the transceivers on the rear wheels.

SUMMARY OF THE INVENTION

The present invention has been made in view of the above-mentioned problems.

According to the present invention, there is provided a wheel identifying apparatus for use in a vehicle. The vehicle includes a body, two front wheels, two rear wheels, a front axle, and a rear axle. The wheel identifying apparatus includes first and second triggering devices, first to fourth transceivers, a receiver, and a wheel identifier.

The first triggering device transmits a first trigger signal. The first triggering device is located on the body of the vehicle closer to the front axle than the rear axle and closer to one of the front wheels than the other.

The first and second transceivers are respectively located on the front wheels of the vehicle. Each of the first and second transceivers is configured to receive the first trigger signal, determine strength of the first trigger signal thereat, and transmit a response signal that conveys signal strength information on the determined strength of the first trigger signal.

The second triggering device transmits a second trigger signal. The second triggering device is located on the body of the vehicle closer to the rear axle than the front axle and closer to one of the rear wheels than the other.

The third and fourth transceivers are respectively located on the rear wheels of the vehicle. Each of the third and fourth transceivers is configured to receive the second trigger signal, determine strength of the second trigger signal thereat, and transmit a response signal that conveys signal strength information on the determined strength of the second trigger signal.

The receiver is provided on the body of the vehicle to receive all the response signals transmitted by the four transceivers.

The wheel identifier is provided on the body of the vehicle and identifies, for each of the response signals received by the receiver, the wheel on which the transceiver having transmitted the response signal is located based on the signal strength information conveyed by the response signal.

Further, in the wheel identifying apparatus, the first triggering device is so mounted on the body of the vehicle as to have the same height as the front axle and an orientation angle in a range of 0 to 90°. The orientation angle of the first triggering device is defined to be 0° when the transmission direction of the first trigger signal on a horizontal plane is toward the one of right and left sides on which the farther one of the first and second transceivers to the first triggering device is located and be 90° when the transmission direction of the first trigger signal is toward the one of front and rear sides on which the front axle of the vehicle is located. The second triggering device is so mounted on the body of the vehicle as to have the same height as the rear axle and an orientation angle in a range of 0 to 90°. The orientation angle of the second triggering device is defined to be 0° when the transmission direction of the second trigger signal on a horizontal plane is toward the one of right and left sides on which the farther one of the third and fourth transceivers to the second triggering device is located and be 90° when the transmission direction of the second trigger signal is toward the one of front and rear sides on which the rear axle of the vehicle is located.

With the above mounting structure of the first and second triggering devices, the first trigger signal can be reliably received by both the first and second transceivers, and the second trigger signal can be reliably received by both the third and fourth transceivers. Consequently, it is possible for the wheel identifier to accurately identify, for each of the response signals, the wheel on which the transceiver having transmitted the response signal is located based on the signal strength information conveyed by the response signal.

It is preferable that the orientation angle of the first triggering device be in a range of 30 to 60°. It is also preferable that the orientation angle of the second triggering device be in a range of 30 to 60°.

In a preferred embodiment of the invention, the first triggering device is fixed to a rear lower end of a well of the closer one of the front wheels to the first triggering device. The second triggering device is fixed to a front lower end of a well of the closer one of the rear wheels to the second triggering device. The first and second triggering devices are each made up of a LF magnetic field antenna that is shaped in a coil. The receiver and the wheel identifier are integrated into a single device.

Moreover, the wheel identifying apparatus may be incorporated in a tire inflation pressure detecting apparatus which includes four pressure sensors and a tire pressure determiner. Each of the pressure sensors is provided on one of the four wheels of the vehicle to have an association with both a tire fitted on the wheel and the transceiver located on the wheel; each of the pressure sensors is configured to sense an inflation pressure of the associated tire and output a tire pressure information indicative of the sensed inflation pressure of the associated tire. The response signal transmitted by each of the transceivers conveys, in addition to the signal strength information, the tire pressure information output by the pressure sensor associated with the transceiver. The tire pressure determiner is provided on the body of the vehicle; the tire pressure determiner determines, for each of the response signals received by the receiver, the inflation pressure of the tire associated with the transceiver having transmitted the response signal based on the tire pressure information conveyed by the response signal.

Each of the pressure sensors may be integrated with the associated one of the transceivers into a single device; the receiver, the wheel identifier, and the tire pressure determiner may be integrated into a single device.

BRIEF DESCRIPTION OF THE DRAWINGS

The present invention will be understood more fully from the detailed description given hereinafter and from the accompanying drawings of one preferred embodiment of the invention, which, however, should not be taken to limit the invention to the specific embodiment but are for the purpose of explanation and understanding only.

In the accompanying drawings.

DESCRIPTION OF PREFERRED EMBODIMENT

Figure 1:
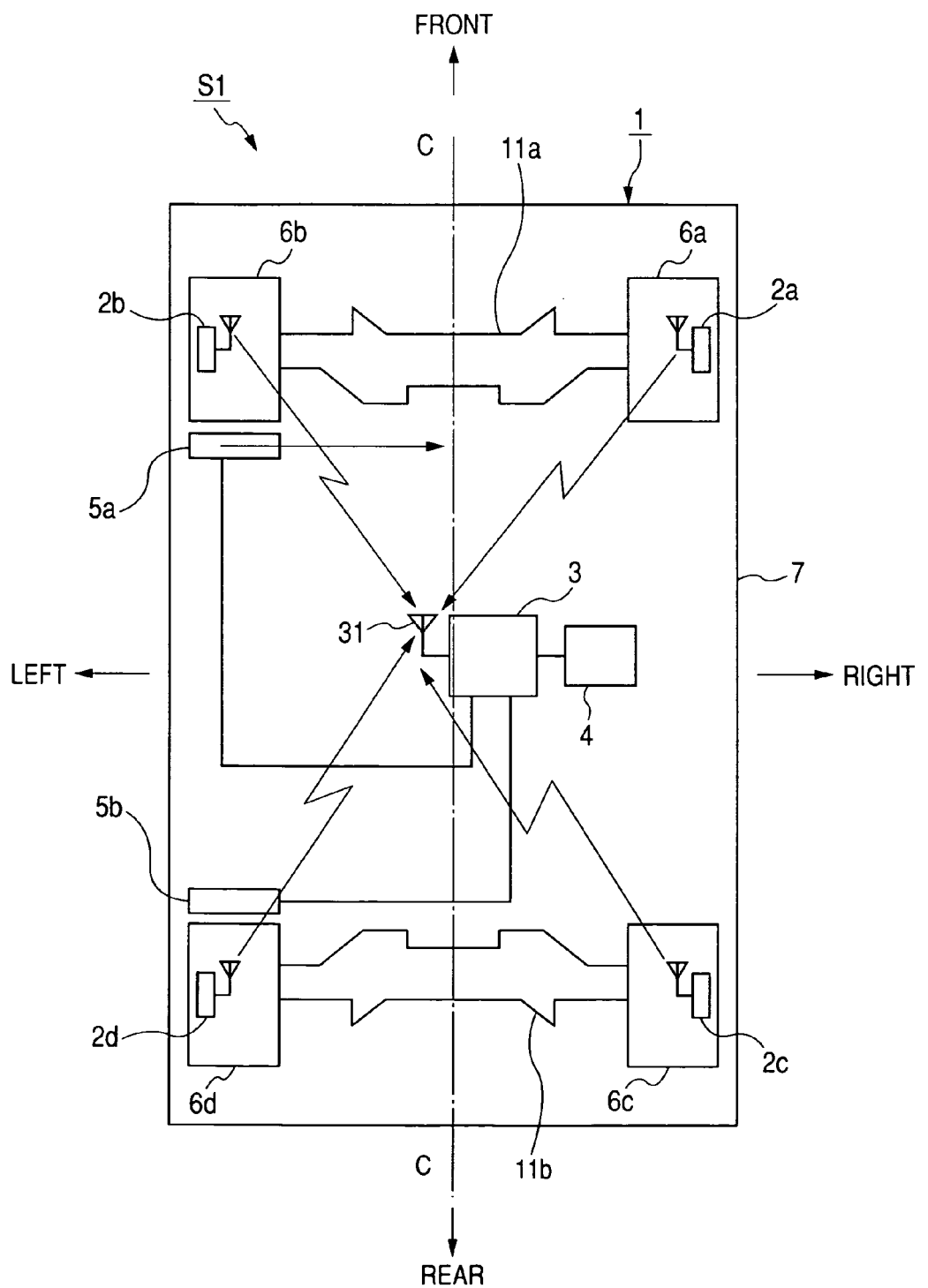
FIG. 1 is a schematic view showing the overall configuration of a tire inflation pressure detecting apparatus for a vehicle according to an embodiment of the invention.

FIG. 1 shows the overall configuration of a tire inflation pressure detecting apparatus S1 according an embodiment of the invention, which also functions as a wheel identifying apparatus.

The tire inflation pressure detecting apparatus S1 is installed to a vehicle 1 to detect the inflation pressures of four tires that are respectively fitted on four wheels 6a-6d of the vehicle 1 (i.e., the FR wheel 6a, the FL wheel 6b, the RR wheel 6c, and the RL wheel 6d).

As shown in FIG. 1, the tire inflation pressure detecting apparatus S1 includes four transceivers 2a-2d, a receiver 3, a warning device 4, and first and second triggering devices 5a and 5b.

The transceivers 2a-2d are respectively mounted on the four wheels 6a-6d of the vehicle 1, so as to respectively have association with the tires fitted on the wheels 6a-6d.

Each of the transceivers 2a-2d senses the inflation pressure of the associated tire and assembles a corresponding frame that contains tire pressure information indicative of the sensed inflation pressure. Further, each of the transceivers 2a-2b receives a first trigger signal transmitted by the first triggering device 5a, determines the strength of the first trigger signal thereat, and assembles into the corresponding frame signal strength information indicative of the determined strength of the first trigger signal; each of the transceivers 2c-2d receives a second trigger signal transmitted by the second triggering device 5b, determines the strength of the second trigger signal thereat, and assembles into the corresponding frame signal strength information indicative of the determined strength of the second trigger signal. Then, each of the transceivers 2a-2d transmits the corresponding frame at a radio frequency.

Figure 2A:
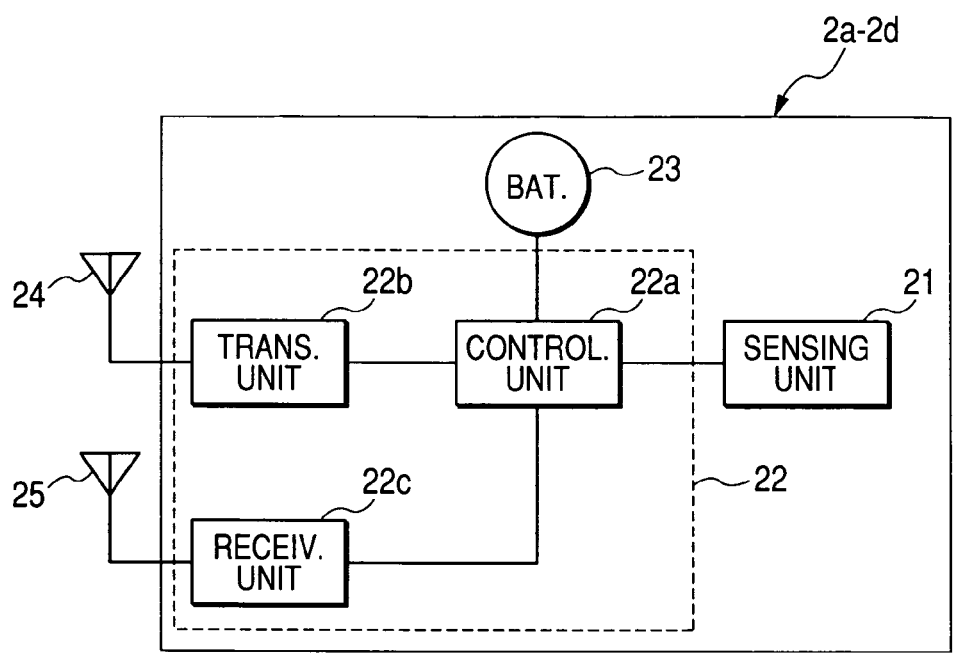
FIG. 2A is a functional block diagram showing the configuration of each of transceivers of the tire inflation pressure detecting apparatus.

Referring to FIG. 2A, each of the transceivers 2a-2d is configured with a sensing unit 21, a microcomputer 22, a battery 23, a transmitting antenna 24, and a receiving antenna 25.

The sensing unit 21 includes sensors, such as a diaphragm-type pressure sensor and a temperature sensor, and outputs signals representative of the inflation pressure and inside temperature of the associated tire sensed by the pressure sensor and temperature sensor.

The microcomputer 22 is of a well-known type which functionally includes a controlling unit 22a, a transmitting unit 22b, and a receiving unit 22c. The microcomputer 22 is configured to implement predetermined processes in accordance with a program installed in a memory (not shown) of the controlling unit 22a.

The controlling unit 22a receives the signals output from the sensing unit 21 and processes those signals. The controlling unit 22a also assembles the corresponding frame which contains the tire pressure information indicative of the inflation pressure of the associated tire sensed by the pressure sensor, and provides the frame to the transmitting unit 22b.

Further, the controlling unit 22a receives, via the receiving antenna 25 and the receiving unit 22c, the first or second trigger signal, and determines the strength of the received trigger signal through signal processing. The controlling unit 22a also assembles into the corresponding frame signal strength information indicative of the determined strength of the trigger signal. Then, the controlling unit 22a provides the corresponding frame to the transmitting unit 22b.

The transmitting unit 22b transmits, under control of the controlling unit 22a and via the transmitting antenna 24, the frame provided by the controlling unit 22a to the receiver 3 at the radio frequency.

The receiving unit 22c receives, via the receiving antenna 25, the first or second trigger signal and provides the received trigger signal to the controlling unit 22a.

The battery 23 is provided to supply electrical power necessary for operation of the other units.

The above-described transceivers 2a-2d are each fixed to an air valve of the associated one of the wheels 6a-6d, with at least the sensing unit 21 thereof being exposed to the air inside the associated tire.

On the other hand, the receiver 3 is mounted on the body 7 of the vehicle 1. The receiver 3 receives all the frames transmitted by the transceivers 2a-2d, and determines the inflation pressures of the four tires based on the tire pressure information contained in the respective frames. The receiver 3 also identifies, for each of the received frames, the wheel on which the one of the transceivers 2a-2d having transmitted the frame is mounted. The receiver 3 further controls the first and second triggering devices 5a and 5b to respectively transmit the first and second trigger signals.

Figure 2B:
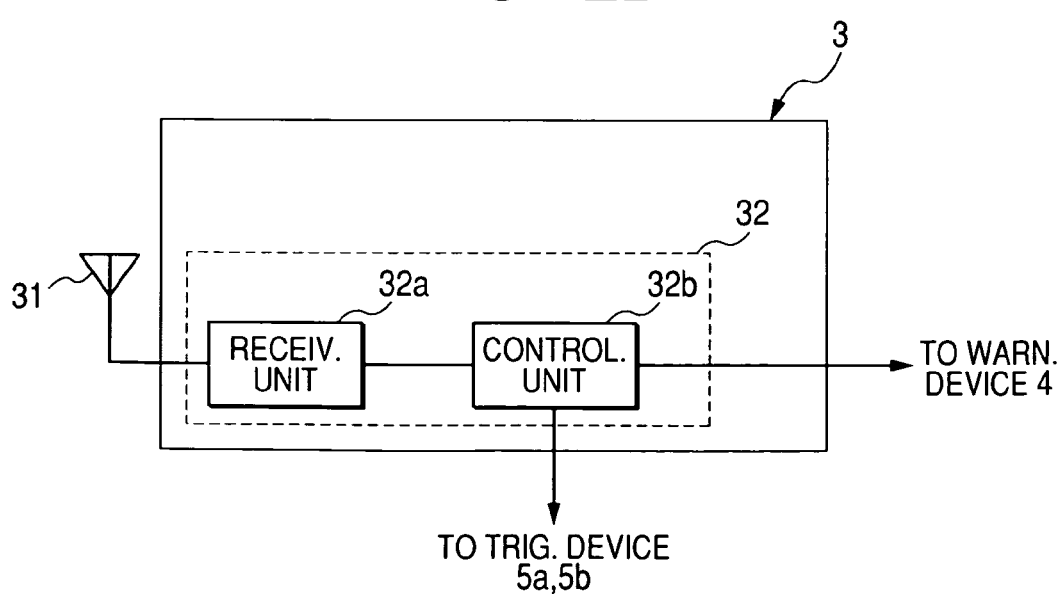
FIG. 2B is a functional block diagram showing the configuration of a receiver of the tire inflation pressure detecting apparatus.

Referring to FIG. 2B, the receiver 3 is configured with a receiving antenna 31 and a microcomputer 32.

The receiving antenna 31 is fixed to the body 7 of the vehicle 1 to receive, as illustrated in FIG. 1, all the frames transmitted by the four transceivers 2a-2d.

The microcomputer 32 is of a well-known type which functionally includes a receiving unit 32a and a controlling unit 32b. The microcomputer 32 is configured to implement predetermined processes in accordance with a program installed in a memory (not shown) of the controlling unit 32b.

The receiving unit 32a receives, via the receiving antenna 31, all the frames transmitted by the transceivers 2 and provides the received frames to the controlling unit 32b.

The controlling unit 32b outputs a first command signal for causing the first triggering device 5a to transmit the first trigger signal, and a second command signal for causing the second triggering device 5b to transmit the second trigger signal.

The controlling unit 32b identifies, for each of the frames received from the receiving unit 32a, the wheel on which the one of the transceivers 2a-2d having transmitted the frame is mounted based on the signal strength information contained in the frame. The controlling unit 32b also determines, for each of the frames received from the receiving unit 32a, the inflation pressure of the associated tire based on the tire pressure information contained in the frame.

Thus, both the inflation pressure and location of each of the four tires can be determined by the controlling unit 32b. When the determined inflation pressure of any of the four tires is below a predetermined threshold Th, the controlling unit 32b outputs to the warning device 4 a warning signal indicative of both the decreased inflation pressure and location of the tire.

The warning device 4 is, as illustrated in FIG. 1, electrically connected to the receiver 3 and located in a place visible for the driver of the vehicle 1. The warning device 4 is configured with, for example, a warning display on the instrument panel of the vehicle 1. The warning device 4 informs, in response to receipt of the warning signal from the receiver 3, the driver of the decreased inflation pressure and location of the tire.

The first triggering device 5a transmits, in response to receipt of the first command signal from the controlling unit 32b of the receiver 3, the first trigger signal at a predetermined strength and a low frequency of, for example, 125-135 kHz. Similarly, the second triggering device 5b transmits, in response to receipt of the second command signal from the controlling unit 32b of the receiver 3, the second trigger signal at the predetermined strength and the low frequency.

In the present embodiment, the first and second triggering devices 5a and 5b are each made up of a LF (Low Frequency) magnetic field antenna that is shaped in a coil.

Further, the first triggering device 5a is located closer to the front axle than the rear axle of the vehicle 1, 50 as to allow only the transceivers 2a and 2b to receive the first trigger signal. Moreover, the first triggering device 5a is offset from the longitudinal centerline C-C of the vehicle 1, so as to make the strengths of the first trigger signal at the transceivers 2a and 2b different from each other. On the other hand, the second triggering device 5b is located closer to the rear axle than the front axle of the vehicle 1, so as to allow only the transceivers 2c and 2d to receive the second trigger signal. Moreover, the second triggering device 5b is also offset from the longitudinal centerline C-C of the vehicle 1, so as to make the strengths of the second trigger signal at the transceivers 2c and 2d different from each other.

In the present embodiment, the first triggering device 5a is located in the vicinity of the FL wheel 6b, while the second triggering device 5b is located in the vicinity of the RL wheel 6d. Consequently, the strength of the first trigger signal is higher at the transceiver 2b than at the transceiver 2a, and the strength of the second trigger signal is higher at the transceiver 2d than at the transceiver 2c.

In addition, it is preferable for the first and second triggering devices 5a and 5b to be located in places where no metal members completely surround the devices 5a and 5b and it is possible to protect the devices 5a and 5b from foreign matter, such water and a stone. Accordingly, in the present embodiment, the first triggering device 5a is located within the well of the FL wheel 6b, and the second triggering device 5b is located within the well of the RL wheel 6d.

Furthermore, in the present embodiment, the first triggering device 5a is mounted on the rear side of the front wheels 6a and 6b, with the same height as the front axle of the vehicle 1 and an orientation angle in a range of 0-90°, preferably in a range of 30-60°. The orientation angle of the first triggering device 5a is here defined to be 0° when the transmission direction (i.e., the transmission axis) of the first trigger signal on a horizontal plane is toward the right and be 90° when the transmission direction is toward the front. On the other hand, the second triggering device 5b is mounted on the front side of the rear wheels 6c and 6d, with the same height as the rear axle of the vehicle 1 and an orientation angle in a range of a range of 0-90°, preferably in a range of 30-60°. The orientation angle of the second triggering device 5b is here defined to be 0° when the transmission direction of the second trigger signal on a horizontal plane is toward the right and be 90° when the transmission direction is toward the rear.

The above-described mounting structure of the first and second triggering devices 5a and 5b has been defined based on the results of an investigation by the inventors which will be described hereinafter.

Figure 3A:
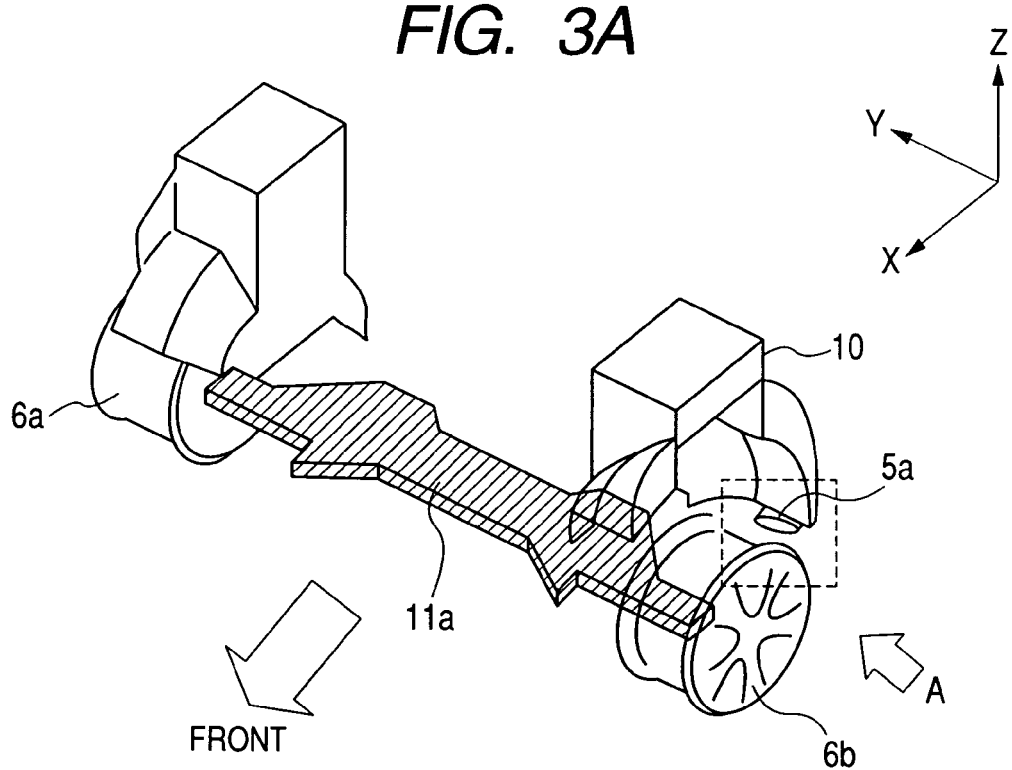
FIG. 3A is a schematic perspective view illustrating the mounting of a first triggering device of the tire inflation pressure detecting apparatus on the vehicle.
Figure 3B:
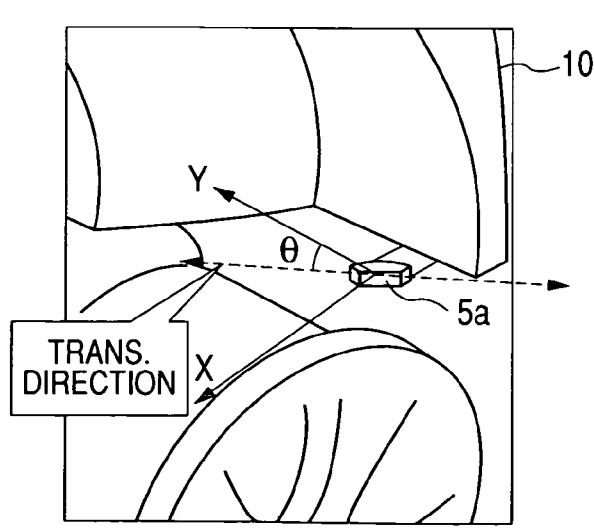
FIG. 3B is an enlarged perspective view showing the vicinity of the first triggering device which is enclosed with a dashed line in FIG. 3A.
Figure 3C:
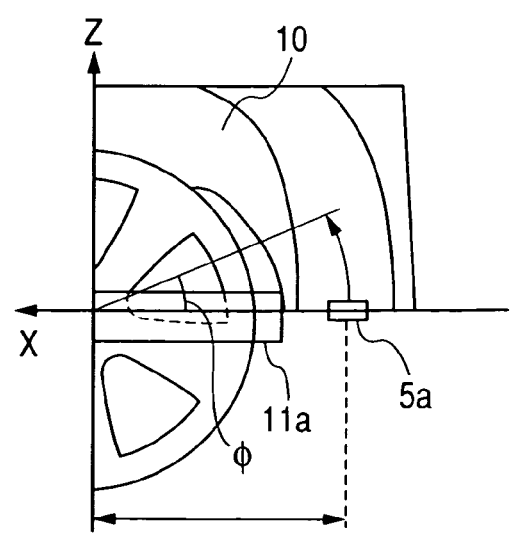
FIG. 3C is an enlarged side view along the direction A in FIG. 3A showing the vicinity of the first triggering device.
Figure 4:
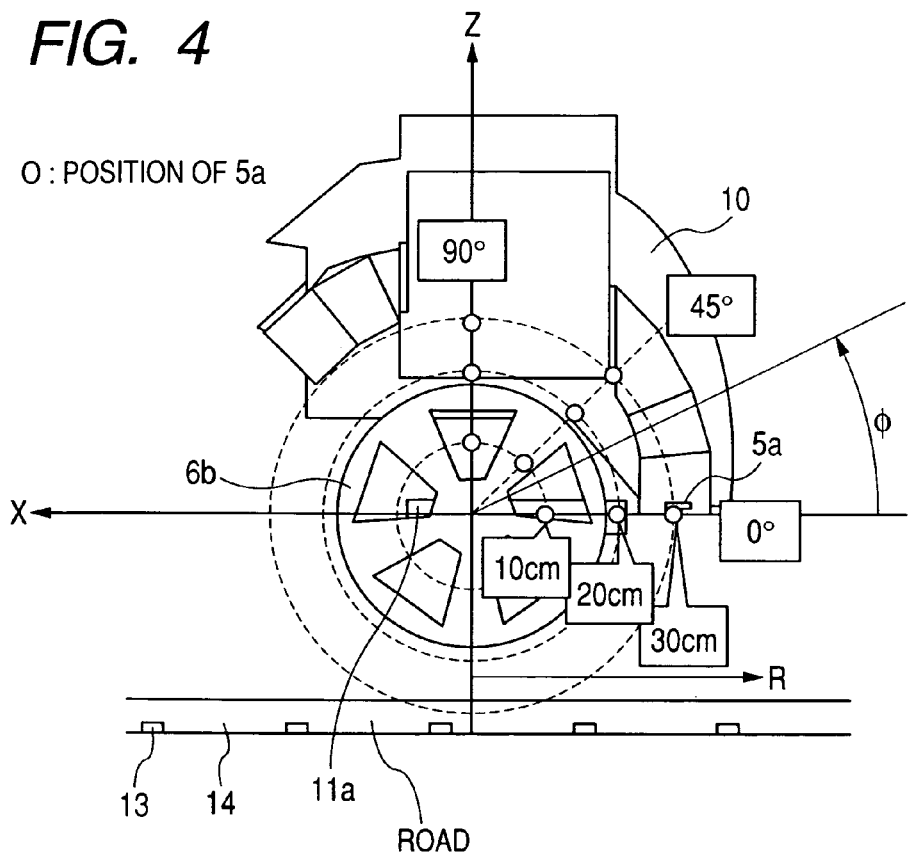
FIG. 4 is a schematic side view showing a variety of positions of the first triggering device tested in an investigation by the inventors.

FIGS. 3A-3B illustrates the mounting of the first triggering device 5a on the vehicle 1. It should be noted that though FIG. 3A is not a cross-sectional view, part of it is hatched for the sake of easier understanding. FIG. 4 illustrates a variety of positions of the first triggering device 5a tested in the investigation. In addition, in FIGS. 3A-4, X, Y, and Z respectively represent the forward, rightward, and upward directions of the vehicle 1.

In the investigation, the effects of parameters R and Φ on the strength of the first trigger signal at the transceiver 2a were first determined by a computer simulation. Here, the parameter R represents the position of the first triggering device 5a in the radial direction of the FL wheel 6b on a X-Z plane which is perpendicular to the Y direction and bisects the width of the FL wheel 6b; the parameter Φ represents the angle between a radius of the FL wheel 6b passing the first triggering device 5a and the X direction on the X-Z plane.

In the computer simulation, the parameter R was varied among 10, 20, and 30 cm; the parameter Φ was varied among 0, 45, 90°. For each of the positions of the first triggering device 5a, the strength of the first trigger signal at the transceiver 2a was determined.

In addition, since the first trigger signal is transmitted at the low frequency, the front-side lower suspension arm 11a of the vehicle 1 has a great influence on the propagation of the first trigger signal. Therefore, in the computer simulation, the specific inductive capacity μr of the lower suspension arm 11a was set to 4000 which corresponds to the specific inductive capacity of iron. On the contrary, since the front wheels 6a and 6b and the front wheel wells 10 have a much less influence on the propagation of the first trigger signal, the specific inductive capacities μr thereof were set to 1.0 which corresponds to the specific inductive capacity of air. Further, the road was supposed to be constructed of concrete 14 (μr=1.0) reinforced with steel 13 (μr=4000). In addition, the orientation angle θ of the first triggering device 5a was set 0°.

Figure 5:
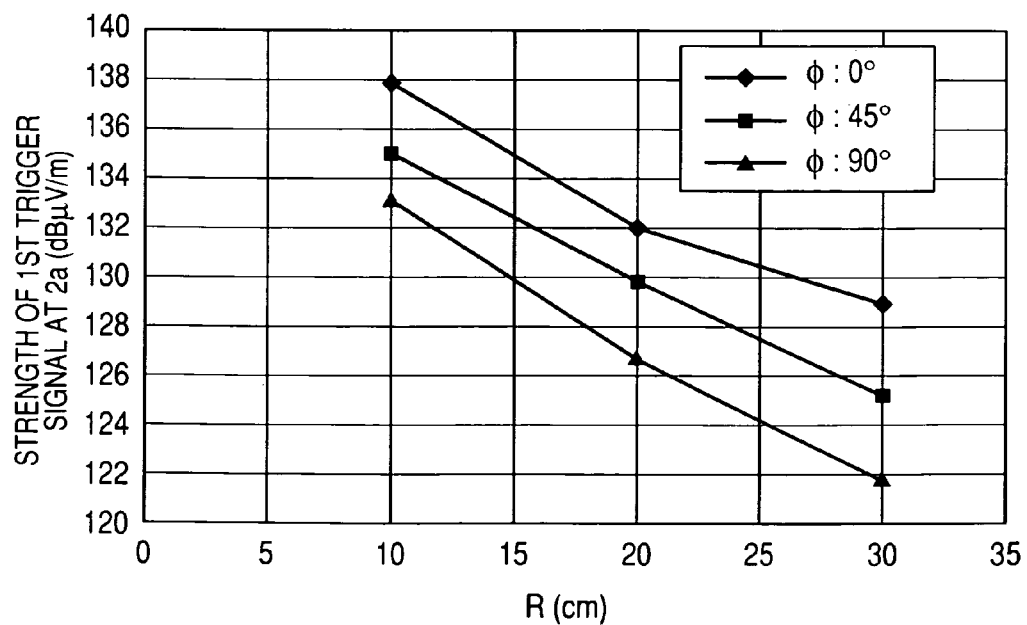
FIG. 5 is a graphical representation showing the results of a computer simulation made in the investigation.

FIG. 5 shows the simulation results, where the horizontal axis represents the parameter R, the vertical axis represents the strength of the first trigger signal at the transceiver 2a, and the plots "♦", "■", and "▲" indicate the results for the three different values of Φ.

As can be seen from FIG. 5, the strength of the first trigger signal at the transceiver 2a decreased with increase in R; in other words, the closer the first triggering device 5a was to the axis of the FL wheel 6b, the stronger the first trigger signal was at the transceiver 2a. Moreover, the strength of the first trigger signal at the transceiver 2a decreased also with increase in Φ; in other words, the less the first triggering device 5a was away from the horizontal plane including the axis of the FL wheel 6b in the circumferential direction, the stronger the first trigger signal was at the transceiver 2a.

The above results can be attributed to the fact that the first trigger signal is propagated to the transceiver 2a via the front-side lower suspension arm 11a, and thus the strength of the first trigger signal at the transceiver 2a increases as the distance from the first triggering device 5a to the arm 11a decreases. Further, the distance from the first triggering device 5a to the front-side lower suspension arm 11a decreases with R; the distance also decreases with Φ because the arm 11a has the shape of a plate extending in the lateral direction of the vehicle 1.

Accordingly, to maximize the strength of the first trigger signal at the transceiver 2a, it is necessary for the first triggering device 5a to be mounted at the same height as the front axle of the vehicle 1 and as close to the axis of the FL wheel 6b as possible.

Practically, it is impossible to mount the first triggering device 5a within the FL wheel 6b. Therefore, in the present embodiment, the first triggering device 5a is fixed to the rear lower end of the FL wheel well 10, which is the practically optimal position for mounting the first triggering device 5a.

Further, the effect of the orientation angle θ of the first triggering device 5a on the strength of the first trigger signal at the transceiver 2a was also determined by a computer simulation. The orientation angle θ, which has been defined above, is illustrated in FIG. 3B as the angle between the transmission axis of the first triggering device 5a and the Y direction on the X-Y plane which includes the axis of the FL wheel 6b.

In the computer simulation, the orientation angle θ of the first triggering device 5a was varied to have the values of 0, 30, 60, and 90°, for each of which the strength of the first trigger signal at the transceiver 2a was determined. Additionally, in the computer simulation, the parameters R and Φ were set to 30 cm and 0°, respectively.

Figure 6:
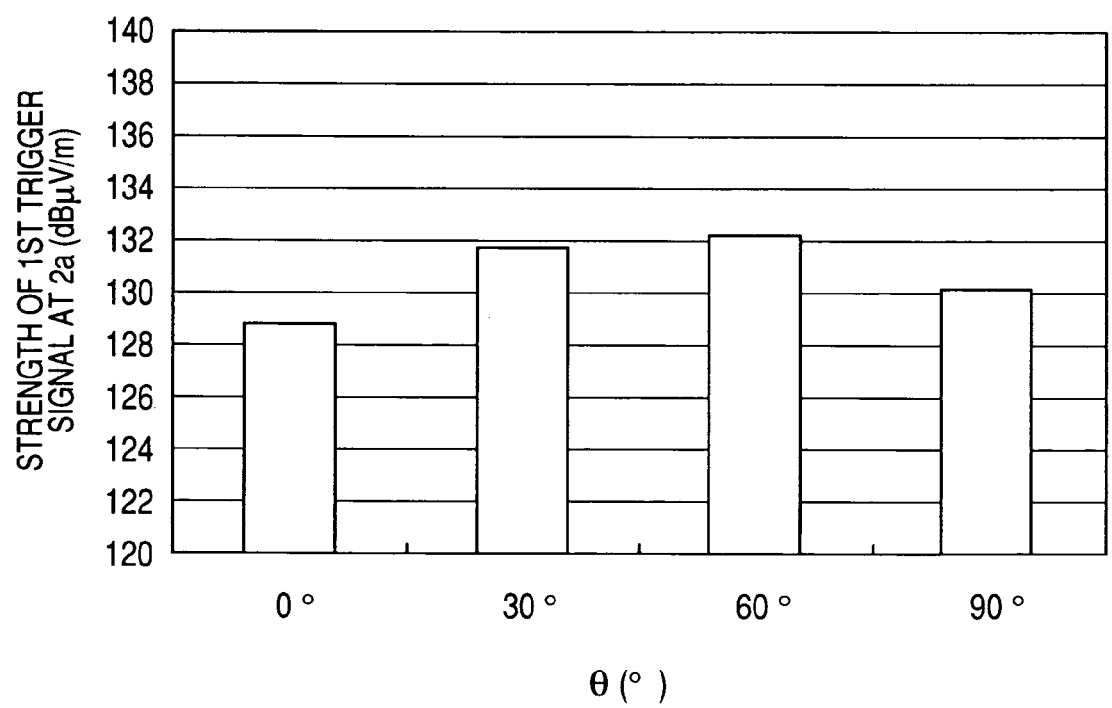
FIG. 6 is a graphical representation showing the results of another computer simulation made in the investigation.

FIG. 6 shows the simulation results, where the horizontal axis represents the orientation angle θ of the first triggering device 5a, and the vertical axis represents the strength of the first trigger signal at the transceiver 2a.

As can be seen from FIG. 6, the strength of the first trigger signal at the transceiver 2a was high when the orientation angle θ of the first triggering device 5a was in the range of 0 to 90°, in other words, when the transmission direction (or the transmission axis) of the first triggering device 5a was toward the front-side lower suspension arm 11a. Further, the strength of the first trigger signal at the transceiver 2a was particularly high when the orientation angle θ of the first triggering device 5a was in the range of 30 to 60°.

Accordingly, to allow the transceiver 2a on the FR wheel 6a to reliably receive the first trigger signal, it is necessary for the first triggering device 5a to be mounted with the orientation angle θ being in the range of 0 to 90°, preferably in the range of 30 to 60°.

For the second triggering device 5b, results similar to the above-described results for the first triggering device 5a have been obtained.

However, it is preferable for the second triggering device 5b to be mounted on the front side of the rear wheels 6c and 6d, whereas it is preferable for the first triggering device 5a to be mounted on the rear side of the front wheels 6a and 6b. This is because the rear-side lower suspension arm 11b of the vehicle 1 protrudes from the rear axle more in the forward direction than in the rearward direction, whereas the front-side lower suspension arm 11a protrudes from the front axle more in the rearward direction than in the forward direction.

Accordingly, the orientation angle of the second triggering device 5b is so defined as to have the value of 0° when the transmission direction of the second trigger signal is toward the right and the value of 90° when the same is toward the rear. Further, to allow the transceiver 2c on the RR wheel 6c to reliably receive the second trigger signal, it is necessary for the second triggering device 5b to be mounted with the orientation angle being in the range of 0 to 90°, preferably in the range of 30 to 60°.

Moreover, to maximize the strength of the second trigger signal at the transceiver 2c, it is necessary for the second triggering device 5b to be mounted at the same height as the rear axle of the vehicle 1 and as close to the axis of the RL wheel 6d as possible. In the present embodiment, the second triggering device 5b is fixed to the front lower end of the RL wheel well, which is the practically optimal position for mounting the second triggering device 5b.

With the above-described mounting structure of the first and second triggering devices 5a and 5b, both the transceivers 2a and 2b can reliably receive the first trigger signal, and both the transceivers 2c and 2d can reliably receive the second trigger signal. As a result, it is possible for the receiver 3 to accurately identity, for each of the received frames, the wheel on which the transceiver having transmitted the frame is located based on the signal strength information conveyed by the frame.

While the above particular embodiment of the invention has been shown and described, it will be understood by those skilled in the art that various modifications, changes, and improvements may be made without departing from the spirit of the invention.

For example, in the previous embodiment, the first triggering device 5a is mounted closer to the transceiver 2b than the transceiver 2a, and the orientation angle of the first triggering device 5a is defined to be 0° when the transmission direction of the first trigger signal is toward the right on which the transceiver 2a (i.e., the farther one of the transceivers 2a and 2b to the first triggering device 5a) is located. The second triggering device 5b is mounted closer to the transceiver 6d than the transceiver 6c, and the orientation angle of the second triggering device 5b is defined to be 0° when the transmission direction of the second trigger signal is toward the right on which the transceiver 2c (i.e., the farther one of the transceivers 2c and 2d to the second triggering device 5b) is located.

However, the first triggering device 5a may also be mounted closer to the transceiver 2a than the transceiver 2b, and the second triggering device 5b may also be mounted closer to the transceiver 2c than the transceiver 2d. In this case, the orientation angle of the first triggering device 5a can be defined to be 0° when the transmission direction of the first trigger signal is toward the left on which the transceiver 2b (i.e., the farther one of the transceivers 2a and 2b to the first triggering device 5a) is located; the orientation angle of the second triggering device 5b can be defined to be 0° when the transmission direction of the second trigger signal is toward the left on which the transceiver 2d (i.e., the farther one of the transceivers 2c and 2d to the second triggering device 5b) is located.

Moreover, in the previous embodiment, the first triggering device 5a is mounted on the rear side of the front axle of the vehicle 1, and the orientation angle of the first triggering device 5a is defined to be 90° when the transmission direction of the first trigger signal is toward the front on which the front axle is located. The second triggering device 5b is mounted on the front side of the rear axle of the vehicle 1, and the orientation angle of the second triggering device 5b is defined to be 90° when the transmission direction of the second trigger signal is toward the rear on which the rear axle is located.

However, the first triggering device 5a may also be mounted on the front side of the front axle and the second triggering device 5b may also be mounted on the rear side of the rear axle, to the extent that they are sufficiently close to the front and rear axles, respectively. In this case, the orientation angle of the first triggering device 5a can be defined to be 90° when the transmission direction of the first trigger signal is toward the rear on which the front axle is located; the orientation angle of the second triggering device 5b can be defined to be 90° when the transmission direction of the second trigger signal is toward the front on which the rear axle is located.

What is claimed is:

1. A wheel identifying apparatus for use in a vehicle which includes a body, two front wheels, two rear wheels, a front axle, and a rear axle, the wheel identifying apparatus comprising:
    a first triggering device that transmits a first trigger signal, the first triggering device being located on the body of the vehicle closer to the front axle than the rear axle and closer to one of the front wheels than the other;
    first and second transceivers which are respectively located on the front wheels of the vehicle, each of the first and second transceivers being configured to receive the first trigger signal, determine strength of the first trigger signal thereat, and transmit a response signal that conveys signal strength information on the determined strength of the first trigger signal;
    a second triggering device that transmits a second trigger signal, the second triggering device being located on the body of the vehicle closer to the rear axle than the front axle and closer to one of the rear wheels than the other;
    third and fourth transceivers which are respectively located on the rear wheels of the vehicle, each of the third and fourth transceivers being configured to receive the second trigger signal, determine strength of the second trigger signal thereat, and transmit a response signal that conveys signal strength information on the determined strength of the second trigger signal;
    a receiver provided on the body of the vehicle to receive all the response signals transmitted by the four transceivers; and
    a wheel identifier that is provided on the body of the vehicle and identifies, for each of the response signals received by the receiver, the wheel on which the transceiver having transmitted the response signal is located based on the signal strength information conveyed by the response signal,
    wherein
    the first triggering device is so mounted on the body of the vehicle as to have the same height as the front axle and an orientation angle in a range of 0 to 90°, the orientation angle of the first triggering device being defined to be 0° when a transmission direction of the first trigger signal on a horizontal plane is toward the one of right and left sides on which the farther one of the first and second transceivers to the first triggering device is located and be 90° when the transmission direction of the first trigger signal is toward the one of front and rear sides on which the front axle of the vehicle is located, and
    the second triggering device is so mounted on the body of the vehicle as to have the same height as the rear axle and an orientation angle in a range of 0 to 90°, the orientation angle of the second triggering device being defined to be 0° when a transmission direction of the second trigger signal on a horizontal plane is toward the one of right and left sides on which the farther one of the third and fourth transceivers to the second triggering device is located and be 90° when the transmission direction of the second trigger signal is toward the one of front and rear sides on which the rear axle of the vehicle is located.

2. The wheel identifying apparatus as set forth in claim 1, wherein the orientation angle of the first triggering device is in a range of 30 to 60°.

3. The wheel identifying apparatus as set forth in claim 1, wherein the first triggering device is fixed to a rear lower end of a well of the closer one of the front wheels to the first triggering device.

4. The wheel identifying apparatus as set forth in claim 1, wherein the orientation angle of the second triggering device is in a range of 30 to 60°.

5. The wheel identifying apparatus as set forth in claim 1, wherein the second triggering device is fixed to a front lower end of a well of the closer one of the rear wheels to the second triggering device.

6. The wheel identifying apparatus as set forth in claim 1, wherein the first and second triggering devices are each made up of a LF magnetic field antenna that is shaped in a coil.

7. The wheel identifying apparatus as set forth in claim 1, wherein the receiver and the wheel identifier are integrated into a single device.

8. The wheel identifying apparatus as set forth in claim 1, wherein the wheel identifying apparatus is incorporated in a tire inflation pressure detecting apparatus which comprises:
    four pressure sensors each of which is provided on one of the four wheels of the vehicle to have an association with both a tire fitted on the wheel and the transceiver located on the wheel, each of the pressure sensors being configured to sense an inflation pressure of the associated tire and output a tire pressure information indicative of the sensed inflation pressure of the associated tire; and
    a tire pressure determiner provided on the body of the vehicle to determine the inflation pressures of the tires, and
    wherein
    the response signal transmitted by each of the transceivers conveys, in addition to the signal strength information, the tire pressure information output by the pressure sensor associated with the transceiver, and
    the tire pressure determiner determines, for each of the response signals received by the receiver, the inflation pressure of the tire associated with the transceiver having transmitted the response signal based on the tire pressure information conveyed by the response signal.

9. The wheel identifying apparatus as set forth in claim 8, wherein each of the pressure sensors is integrated with the associated one of the transceivers into a single device, and the receiver, the wheel identifier, and the tire pressure determiner are integrated into a single device.

* * * * *